Aug. 4, 1942.  T. R. ROBINSON  2,291,650
SHEAR AND STAPLING APPARATUS
Filed May 29, 1939  3 Sheets-Sheet 1
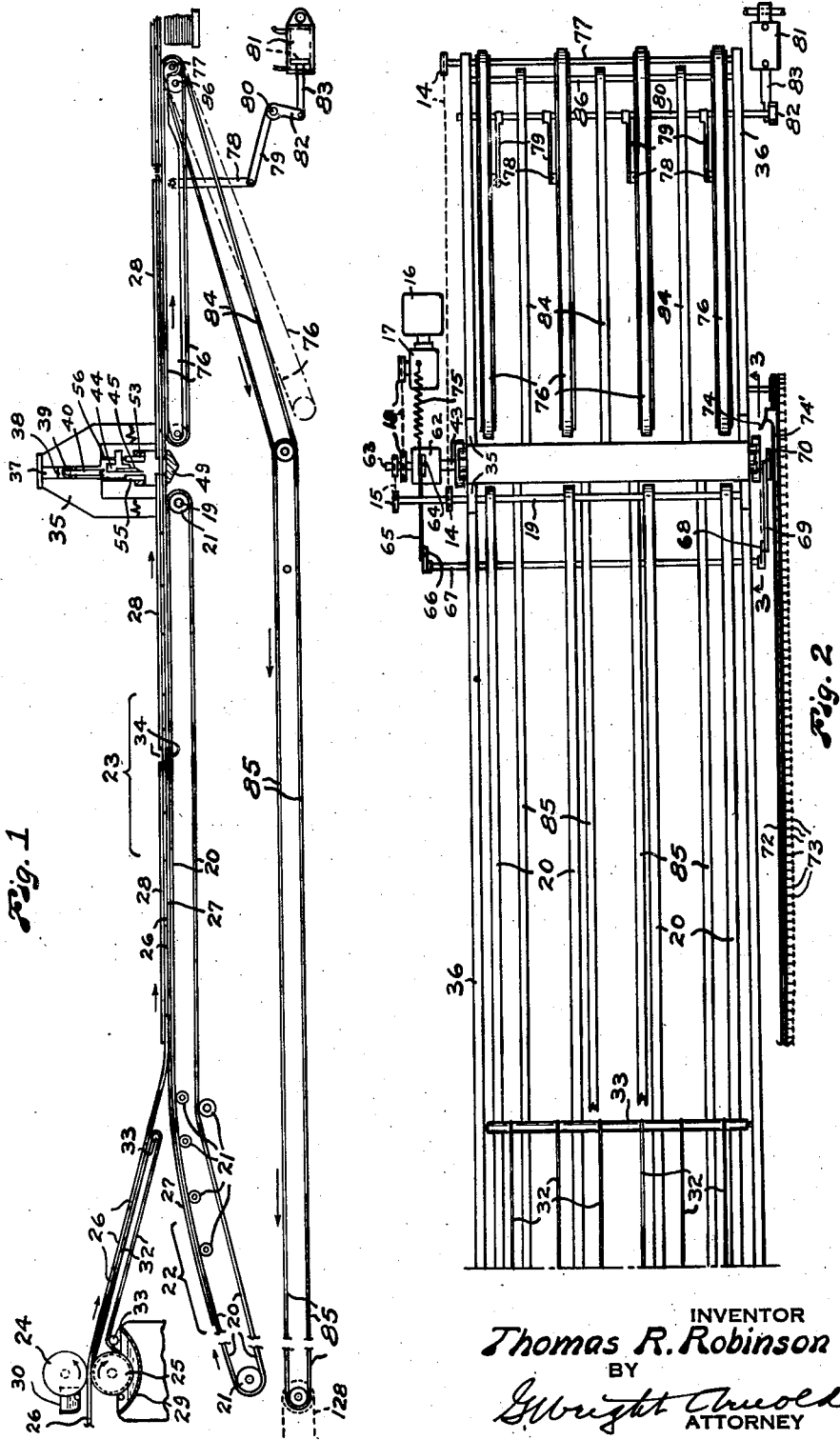
INVENTOR
Thomas R. Robinson
BY
ATTORNEY

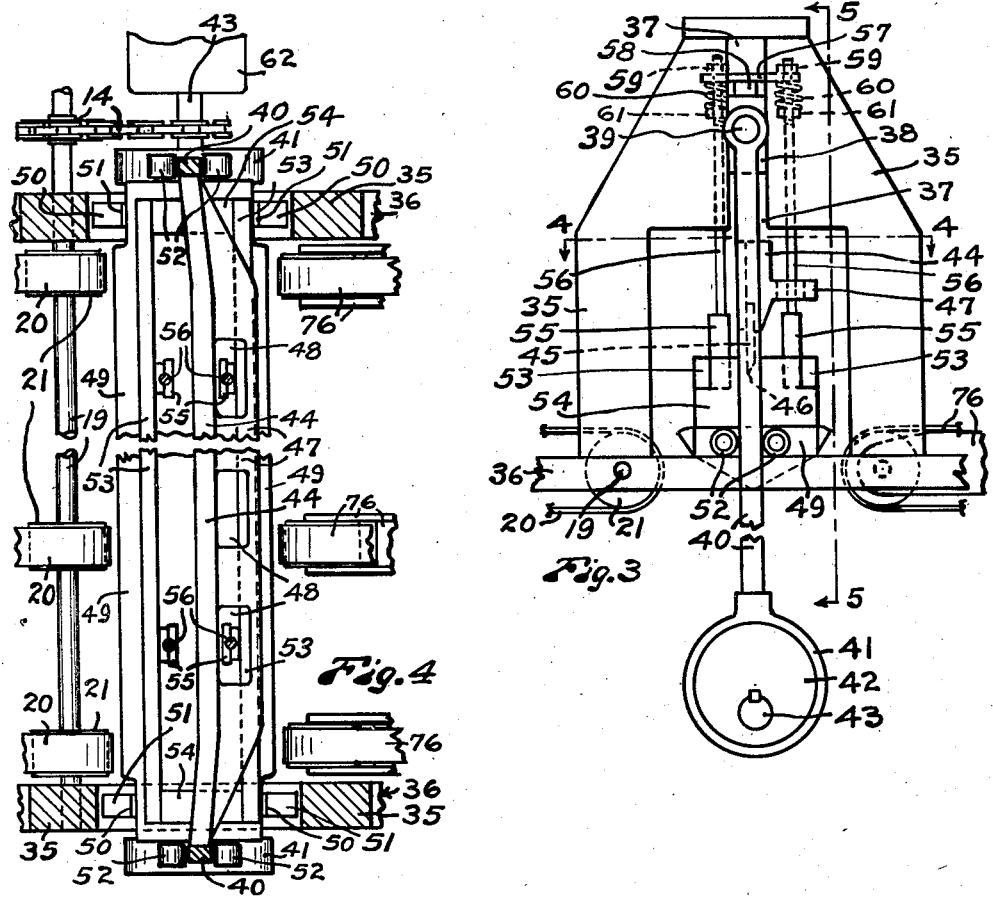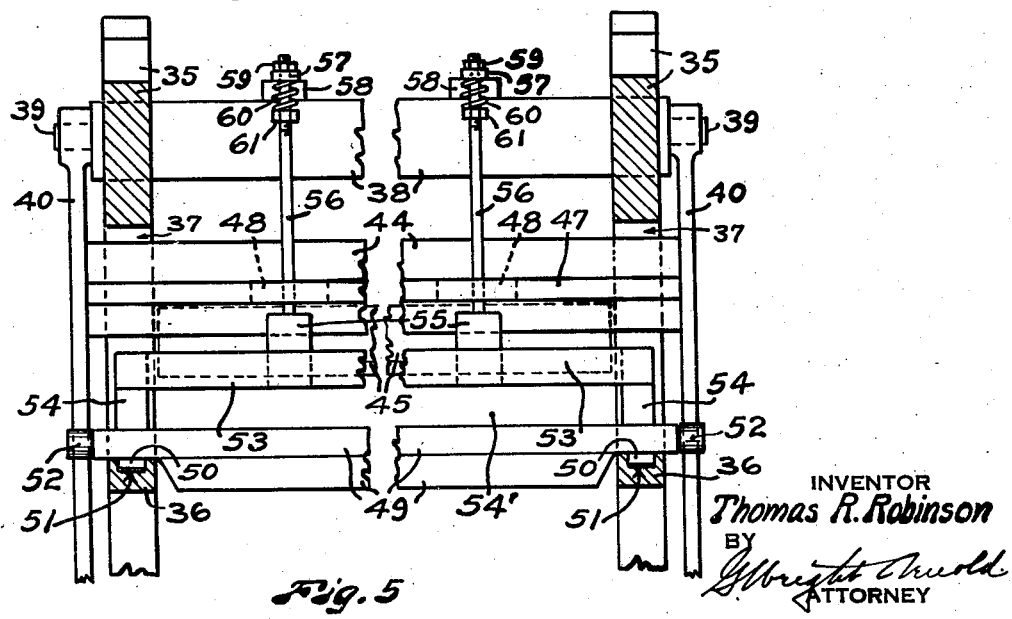

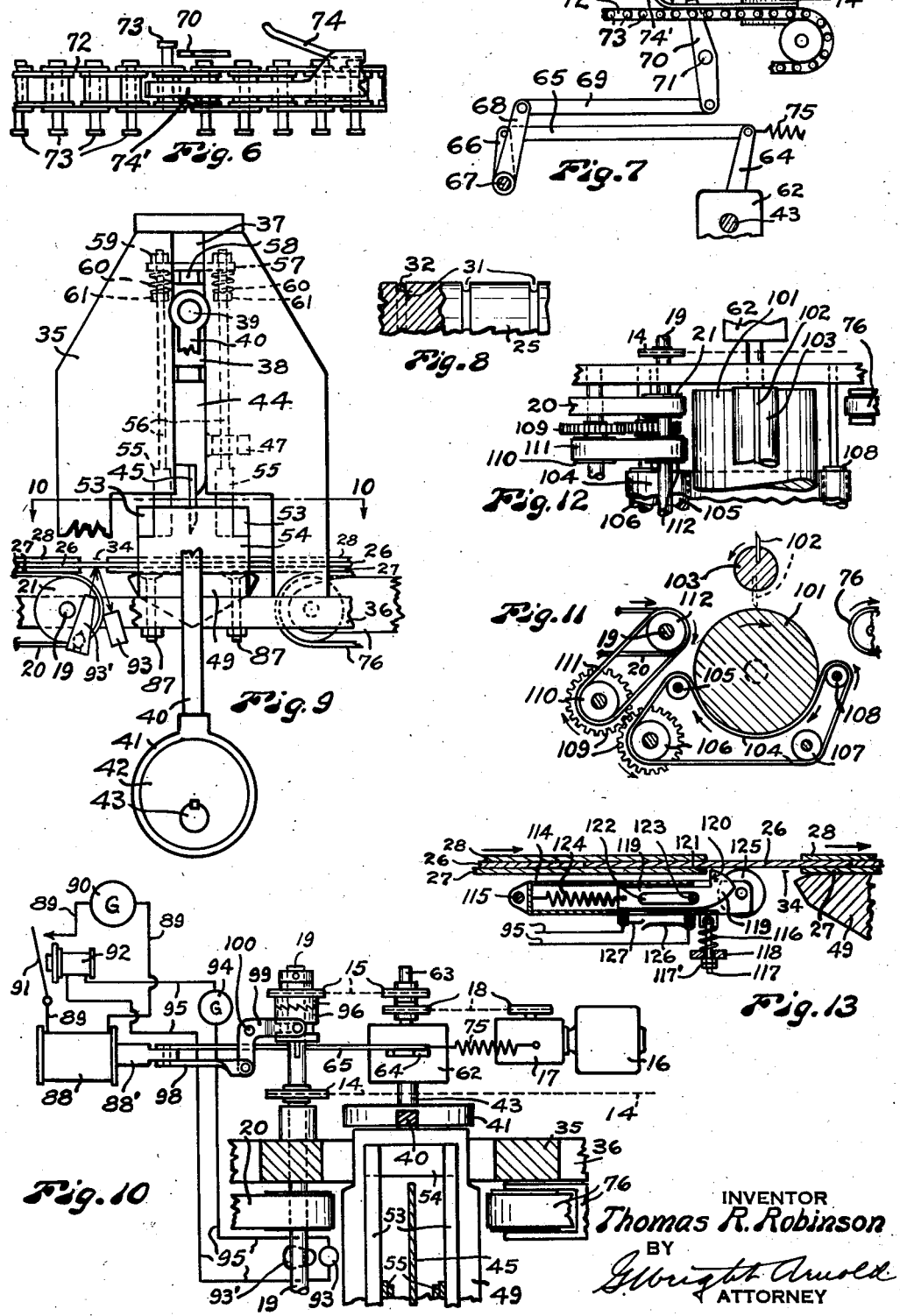

Patented Aug. 4, 1942

2,291,650

UNITED STATES PATENT OFFICE 2,291,650

SHEAR AND STAPLING APPARATUS

Thomas R. Robinson, Everett, Wash.

Application May 29, 1939, Serial No. 276,369

3 Claims. (Cl. 144—1)

This invention relates to a method of and apparatus for forming plywood and a general object of the invention is to provide a method of and apparatus for laying up or forming plywood by which waste of material is reduced to a minimum, production in the plant is speeded up, cost of manufacture is reduced, and a better and more uniform product is provided.

In the manufacture of plywood it has heretofore been common practice to lay up each panel of plywood separately by taking strips of cross banding stock (sometimes referred to as core stock) as they come from the glue rolls, placing the required number of layers of this cross banding stock between suitable face members to build up the number of plies desired and then curing the glue in the panels. As the cross banding stock is usually of random widths, in laying up of separate plywood panels it is generally necessary to allow the cross banding to overhang the edges of the panels a substantial amount. This overhanging cross banding has glue on both faces thereof and the overhang is later trimmed away as waste. It is thus seen that this commonly employed method of laying up plywood results in a waste of cross banding stock and a waste of the glue on the trimmed away cross banding.

In accordance with this invention, I provide a method of and apparatus for laying up plywood in such a manner that the face members thereof are in line and in slightly spaced apart edge to edge relation and the cross banding stock is in a layer extending continuously over both the face members and the spaces between the face members at the time of laying up. Then the cross banding is severed at the spaces between the face members after the laying up is completed. This provides a method by which the plywood is laid up in continuous in line operation and the loss of cross banding stock and glue due to overhang of cross banding is reduced to a minimum.

Another object of this invention is to provide laid up panels of plywood which can be handled before curing of the glue without danger of displacing the plies thereof. Another object is to pass fastener means through portions of the panels, which will be removed in the later trimming operation, to temporarily secure the several plies of a panel together prior to the curing of the glue in the panels.

Another object is to provide an efficient method of and means for coordinating the laying up of plywood, composed of different numbers of plies, in such a manner as to most efficiently utilize the labor, the veneer presses, and the other machinery used.

Another object is to provide novel and efficient means for cutting the cross banding between adjacent laid up plywood panels and for stapling or otherwise fastening together the plies of the laid up panels while they are in motion.

The above mentioned general objects of my invention, together with others inherent in the same, are attained by the devices illustrated in the following drawings, the same being preferred exemplary forms of embodiment of my invention, throughout which drawings like reference numerals indicate like parts:

Figure 1 is a somewhat diagrammatic side elevation, with parts in section and parts broken away, showing apparatus of preferred form for carrying out this invention;

Fig. 2 is a plan view of apparatus shown in Fig. 1, with parts broken away;

Fig. 3 is a fragmentary side elevation, on a larger scale than Figs. 1 and 2 and looking in the direction indicated by broken line 3—3 of Fig. 2, of cut off and stapling means used in carrying out the invention;

Fig. 4 is a fragmentary view partly in plan and partly in section substantially on broken line 4—4 of Fig. 3;

Fig. 5 is a fragmentary view partly in elevation and partly in section substantially on broken line 5—5 of Fig. 3;

Fig. 6 is a fragmentary plan view showing parts of a link belt control means and devices associated therewith;

Fig. 7 is a fragmentary detached side elevation showing parts of the mechanism connected with the link belt control means;

Fig. 8 is a detached fragmentary view partly in plan and partly in section showing the grooved glue roll around which flexible conveyor means pass;

Fig. 9 is a fragmentary side elevation of a modified form of cut off and stapling machine mechanism;

Fig. 10 is a fragmentary view, partly in plan and partly in section and taken substantially on broken line 10—10 of Fig. 9, showing the apparatus in Fig. 9 and showing somewhat diagrammatically certain electrical and mechanical control devices not shown in Fig. 9;

Fig. 11 is a fragmentary side elevation of a modified form of cut off means;

Fig. 12 is a plan view of the devices shown in Fig. 11 with parts thereof broken away; and Fig. 13 is a side elevation, with parts broken away and with parts in section, of a modified form of control means for the stapling and cut off means.

Referring to Figs. 1 to 6, the numeral 20 designates endless traveling conveyor means supported for movement on suitable sheaves 21. Some of the sheaves 21 are mounted on a driven shaft 19 positioned at an end portion of conveyor 20. The upper lap of conveyor means 20 has an upwardly inclined portion 22 toward the head end of the conveyor 20 and where the laying up of the plywood is started and a substantially horizontal portion 23 toward the other end where the laying up of the plywood is completed.

A pair of glue spreading rolls 24 and 25 are provided near the head end of the conveyor 20. These glue spreading rolls 24 and 25 are preferably positioned above the head end of the conveyor 20, as shown in Fig. 1, and are adapted to have cross banding stock 26 passed therebetween for the purpose of spreading glue evenly on both sides of this cross banding stock 26. The cross banding stock is the stock positioned between two face members 27 and 28 of the plywood with its grain extending at right angles to the grain of the face members 27 and 28.

The lower glue roll 25 operates with a portion of its periphery in a glue receptacle 29 and another glue receptacle 30 is provided in connection with the upper glue roll 24. The conventional parts of the glue spreading means not here involved are illustrated somewhat diagrammatically and not described. The lower glue roll 25 has annular grooves 31 in the peripheral portion thereof, see Fig. 8, for the reception of flexible endless conveyor members 32. The conveyor members 32 pass around the lower glue roll 25 in the grooves 31 and are further supported on other rollers 33 to provide glue coated conveyor members for transporting the cross banding stock from the glue rolls to a location where such cross banding stock is to be positioned on lower face members 27 which are being carried by conveyor 20. When the conveyor members 32 are positioned as shown in Fig. 1, they may deliver the cross banding stock to which the glue has been applied directly onto the lower face members 27. Preferably the conveyor members 32 are of flexible wire, such as twisted wire cable. These cables are glue coated and move with the cross banding and their contact area on the cross banding stock is relatively small, thereby insuring uniform distribution of glue on the cross banding stock including the portions contacting the conveyor members 32.

If the cross banding stock comprises a plurality of random width pieces, the conveyor members 32 may deliver the cross banding stock directly on lower face members 27. In such case an operator is preferably employed to properly position this cross banding on the lower face members.

Also standard glue rolls, as commonly used, may be employed and positioned to deliver pieces of glue coated cross banding stock toward an operator. In such case the cross banding stock will pass longitudinally through the glue rolls as distinguished from the transverse travel of the cross banding stock through glue rolls 24 and 25. In such event the glue coated cross banding stock will be delivered to an operator who will position the pieces of glue coated cross banding stock on the lower face members 27.

If the random width pieces of cross banding stock have been edge glued together to form a continuous strip, the cross banding stock may be directly delivered on the lower face members 27.

The lower face members 27 are placed on the portion 22 of the conveyor 20 in line and in slightly spaced apart edge to edge relation, so as to leave a relatively narrow space 34 between each two adjacent face members, said space 34 being relatively narrow so that waste is reduced to a minimum. The savings in cross banding stock and glue thereon by the use of my invention are readily apparent as the amount of cross banding stock between face members may be reduced to a minimum (as about two inches) while in prior art practices the overhang of the cross banding stock was often twelve inches or more. The cross banding 26 is laid continuously over the face members 27 and across the spaces between adjacent face members 27.

After the cross banding 26 is laid on the lower face members 27, upper face members 28 corresponding in size and shape to the lower face members are placed on the cross banding 26 in registration, so far as practically possible, with the lower face members 27. This provides laid up plywood in which adjacent panels are for the most part connected with each other by cross banding stock. If the edges of adjoining pieces of cross banding stock happen to fall at the location of the spaces 34 between adjacent face members, it will make no difference in the method or in the operation of the apparatus or in the resulting product.

After the laying up of the panels is completed, said panels pass a fastener applying and cut off station at which securing means, such as staples, are passed through the laid up panels adjacent the edges of the face members and the cross banding between adjacent panels is severed. These securing means are for the purpose of securing the plies of the laid up panels against relative movement while they are being handled and before the glue has been cured. The securing means is trimmed away when the panels are trimmed after curing of the glue.

One form of cut off and stapling means is shown in Figs. 1 to 7 inclusive. This means comprises upright frame members 35 supported on horizontal frame bars 36 that are provided at the sides of the conveyor 20 and extend beyond the end of the conveyor 20. Two of the upright frame members 35 are provided at each side of the machine and the frame members 35 at each side of the machine cooperate to form upright guide slots 37 wherein a cross bar 38 is guided for vertical movement. The respective end portions of the cross bar 38 are pivotally connected by outwardly protruding pins 39 with the upper end portions of upright connecting rods 40. The lower end portions of the connecting rods 40 are connected with circular bands 41 that extend around discs 42. The two discs 42 are eccentrically mounted on a common cross shaft 43 and are secured in corresponding angular positions on said shaft 43. Obviously rotation of the shaft 43 will move the connecting rods 40 longitudinally and at the same time will impart a swinging motion thereto. The longitudinal movement of the rods 40 will move a knife means therewith and will also move the cross bar 38 up and down in the slots 37 and the swinging movement of said rods 40 will impart a back and forth motion to a knife, stapler, and die block means as hereinafter set forth.

The knife means comprises a knife carrying bar 44 that extends crosswise of the machine and has its two end portions secured to the respective connecting rods 40, whereby the knife means will be moved vertically and swingingly with said connecting rods. A knife 45 is secured to the bar 44 and provided with a cutting edge 46 for clipping the cross banding stock. A horizontal reinforcing rib 47 is provided on one side of the knife carrying bar 44 to increase the strength and rigidity of said bar and slots 48 are provided in said rib 47 for purposes hereinafter explained.

A die block 49 extends crosswise of the machine. The two end portions of the die block 49 rest on the horizontal frame bars 36 at the sides of the machine and preferably are provided with guide members 50 which operate in grooves 51 in the frame bars 36. Preferably the end portions of the die block, which rest on the frame bars 36, are flat on the bottom side and the bottom portion of said die block is of heavier construction throughout the remainder of its length to provide rigidity. The upper side of the die block is substantially flat and is disposed substantially in the plane of the conveyor means 20 so that plywood carried on the conveyor means 20 will be passed over this die block. Obviously replaceable inserts of well known form, not herein shown, may be provided in this die block, if desired, against which the knife and stapling tools may operate. The lower portions of the upright frame members 35 are spaced apart far enough to provide working clearance for the ends of the die block. Two rollers 52 are provided in transversely spaced apart relation on each end portion of the die block 49 and the respective connecting rods 40 pass between the rollers 52 and engage therewith in such a manner that the transverse movement of the connecting rods 40 will impart a reciprocatory movement to the die block 49. When the die block 49 is being moved in one direction it will move with the plywood and will support the plywood during the cutting and stapling operation.

A bridge member comprising two transversely spaced apart bars 53, see Figs. 3, 4 and 5, is positioned in vertically spaced relation above the upper side of the die block 49, see Fig. 5, and is secured to the die block 49 by foot portions 54 that are provided at each end of the bridge member and rest on and are secured to the die block 49. This leaves a space 54' between the bars 53 of the bridge member and the die block 49 through which the plywood passes. The bars 53 serve as supports for a plurality of stapling devices 55. As these stapling devices are of a well known stardard form of construction readily obtainable on the market, they are herein shown diagrammatically and not described in detail.

The stapling devices 55 are operated by plunger members 56 that are connected with the vertically reciprocable cross bar 38. The plunger members 56 on one side of the knife carrying bar 44 operate through the slots 48. Preferably four stapling devices 55 are provided and these devices are positioned so that they will drive two staples or fasteners in each end portion of each of two adjacent panels during each cycle of operation. This provides for the insertion of mechanical fastening means in each panel at four locations. Obviously a greater or less number of the stapling devices 55 may be used if desired. Also to provide for stapling panels of non-uniform width a plurality of the slots 48 may be provided in rib 47 through which the plungers 56 at one side of the knife carrying bar 44 may operate.

When the laid up plywood panels arrive at the stapling and cutting location, the glue is in an uncured state and the plies of the panels are readily movable relative to each other. Passing staples or fasteners through the face members and cross banding at this location secures the plies of the panels together so that they cannot subsequently slip or shift relative to each other while they are being handled and before the glue has been cured.

Preferably the upper end portion of each plunger 56 passes through a hole in a cross member 57 that is secured by means 58 to the reciprocable cross bar 38. A nut 59 is provided on each plunger 56 above the cross member 57. A compression spring 60 is provided on each plunger 56 below the cross member 57 with the upper end thereof in engagement with the cross member 57 and the lower end thereof resting on a nut 61 on the plunger. When the bar 38 is moved upwardly the plungers 56 will be elevated thereby. When the bar 38 is moved downwardly, a force will be yieldingly exerted on the plungers 56 through the springs 60 to operate the stapling devices. The springs 60 thus serve to permit further downward movement of the connecting rods 40 after the stapling devices have contacted the plywood, thus making it possible to staple plywood of different thicknesses without adjusting the stapling device operating means and also reducing the danger of straining or damaging parts of the stapling devices.

Devices are provided for imparting one cycle of operation to the stapling and cut off means during the time the portions of the cross banding stock, which extend across the space between the face members of adjacent plywood panels, are passing under the knife 45. This is accomplished by connecting the cross shaft 43 with driving means by which the power to drive the shaft 43 is transmitted through a single revolution clutch so that the shaft 43 will be advanced one complete revolution at each cycle of operation. As single revolution clutches are well known pieces of mechanism readily obtainable on the market, and as no particular type thereof is necessary herein, the single revolution clutch herein is diagrammatically shown and the details thereof are not described. Manually controlled means are illustrated in Figs. 2, 6 and 7 for starting the operation of the single revolution clutch.

Referring to Figs. 1 to 7, the cross shaft 43 is connected with a single revolution clutch 62 to which power is supplied by a continuously driven shaft 63. I show the shaft 63 connected by driving means 18 with a power transmission means 17 that is driven by a motor 16. Also I show driving means 15 connecting the shaft 63 with the shaft 19 for driving the conveyor 20 and show driving means 14 connecting shaft 19 with a shaft 77 for driving discharge conveyor means 76 of a form hereinafter described. Operation of the single revolution clutch 62 is controlled by a lever 64 connected by a link 65 with a lever 66 on a shaft 67. The shaft 67 is adapted to be oscillated in one direction by a lever 68 that is connected by a link 69 with another lever 70. The lever 70 is mounted on a pivot 71 and positioned in substantial alignment with the knife 45 and alongside a movable pin type endless link belt 72 which serves as a controller. The pivot 71 is preferably adjustably mounted to permit compensation for delay in operation of the single revolution clutch and parts connected therewith.

The pins 73, that connect together the links of the link belt 72, are of greater length than the thickness of the link belt and are slidable transversely through the links of said link belt as best illustrated in Fig. 6. A cam member 74, positioned adjacent the inner side of the link belt 72, engages with any of the movable pins 73 which have been pushed inwardly, and moves said pins outwardly as respects the link belt 72 after the pins have operated the lever 70. Preferably a hold down member 74' is provided to resist any tendency of link belt 72 to move upwardly when a pin 73 thereof encounters lever 70. After a plywood panel has been laid up, an operator pushes one of the pins 73 inwardly at a location in line with the space between the face members of two adjacent plywood panels. The link belt 72 travels at the same speed as the conveyor 20 and the pin 73 thus pushed inwardly will engage with the lever 70 and oscillate the shaft 67 and engage the single revolution clutch 62 and thereby operate the knife 45 just as the cross banding, which extends across the space 34 between the edges of adjacent face members of the plywood, is positioned under the knife 45. This will operate the knife 45 to cut the cross banding between the two adjacent plywood panels and at the same time operate the stapling devices 55 to drive staples through the superposed plies of each of two adjacent panels. A spring 75 will return the shaft 67 and parts connected therewith to the inoperative position as soon as the pin 73 releases the lever 70, and the single revolution clutch 62 will only impart one revolution to the cross shaft 43 each time it is operated.

As alternatives for the manually controlled link belt 72 for controlling the operation of the stapling and cut off means, I have illustrated types of automatic control, as the photo-electric cell of Figs. 9 and 10 and the catch means of Fig. 13.

The knife 45 and the stapling devices 55 move horizontally with the die block 49 and all of these parts are moving in the same direction and at approximately the same speed at the time the cutting and stapling operations are performed.

From the cut off and stapling devices, the laid up panels pass onto discharge conveyor means preferably composed of a plurality of belt type conveyors 76. The end portions of the conveyors 76, adjacent the cut off and stapling devices, preferably are not connected with each other, but the other end portions of said conveyors 76 preferably are all connected with the same driven shaft 77. When the discharge conveyor members 76 are in a horizontal position, they are operable to deliver laid up plywood panels onto any suitable transfer means by which said panels may be transported to press means for curing the glue.

The conveyor members 76 are supported by suitable means which permits them to be lowered into an inclined position to transfer laid up panels of plywood to another conveyor by which said panels are returned to the head of the assembly line for the purpose of having more plies added thereto. I have shown each conveyor member 76 supported by a link 78 that is connected with a lever 79 on a shaft 80. The shaft 80 is adapted to be oscillated by any suitable means as pneumatic cylinder and piston means 75 connected therewith by a lever 82 and piston rod 83.

Inclined return conveyor means 84 is positioned beneath the conveyor means 76 and connects with a substantially horizontal return conveyor 85. The higher end of the inclined return conveyor means 84 is connected with a shaft 86 that is preferably positioned just in front of and slightly lower than the shaft 77 of the conveyor means 76. The conveyors 84 and 85 are driven in the direction indicated by the arrows in Fig. 1 by any suitable driving means such as driving means 128, Fig. 1, connected to any suitable source of power (not shown). Conveyors 84 and 85 are driven at a higher speed than the conveyors 20 and 76 to quickly remove panels that are being transferred from conveyor means 76 to inclined return conveyor means 84. The conveyor members 76 are not connected by any cross members except the shaft 77 and said members 76 are transversely offset relative to the traveling belts of the inclined return conveyor 84. This makes it possible to lower the conveyor members 76 below the plane of the top of the conveyor 84 to transfer panels from the conveyor members 76 to the conveyor 84. Positioning the shaft 86 a short distance inwardly from, and a short distance below, the plane of the shaft 77, and using rollers or sheaves of the same size on these two shafts keeps the conveyor 84 below and clear of the plywood panels when the conveyor members 76 are horizontal, and leaves the conveyor 84 above the plane of the conveyor members 76 throughout its entire length when the conveyor members 76 are lowered into the dotted line position shown in Fig. 1. The belts of these two conveyors travel in opposite directions and the arrangement of shafts 86 and 77, shown in Fig. 1, avoids bringing the panels into contact with conveyor belts which are moving in directions opposite to the direction of movement of the panels.

In the operation of the devices in Figs. 1 to 8, the conveyors operate continuously. An operator positioned near the head portion 22 of conveyor 20 places lower face members 27 on said conveyor one after another in line and in spaced apart edge to edge relation. As these lower face members travel past the delivery end of the conveyor members 32, the glue coated cross banding 26 is either delivered directly onto the lower face member 27 or is placed by an operator on said face member 27. This cross banding extends crosswise of the face members and is continuous so that it covers the face members and extends across the spaces between the face members. After the cross banding has been placed, another operator places upper face members 28 on top of the cross banding in substantial registration with the lower face members. After the lower face members are properly positioned, the pins 73 of the link belt 72, which are positioned opposite the spaces between the face members, are pushed inwardly. As the pins 73, that are pushed inwardly, successively engage the lever 70 the single revolution clutch 62 is caused to impart successive cycles of movement to the knife and stapling devices to sever the cross banding between the panels and drive staples in the panels. If more plies are to be added to the panels, an operator will actuate the cylinder and piston means 81 at the proper time to lower the conveyor means 76 and transfer the laid up panels to the return conveyors 84 and 85 by which they will be returned to the head of the assembly line. The provision of the return conveyors 84 and 85 together with means for transferring the laid up panels thereto, makes possible the production of plywood panels of three plies or of more than three plies on the same assembly line and with the same apparatus and same number of operators without any loss in efficiency.

Particularly in panels which are to be subjected to a hot press, two three ply panels may be produced during the same period as a five ply panel on the conveyor. As the hot presses are now commonly used, one opening or compartment in the presses is loaded with either two three ply panels or one five ply panel. Thus the production of the conveyor line may be kept in synchronism with the needs of the hot presses.

In Figs. 9 and 10 I have shown alternative cut off, staple device and conveyor drive means which differs from the cut off, staple device and conveyor drive means shown in Figs. 1 to 7 to the extent that the conveyors and plywood thereon are stopped and remain immovable during the cutting off and stapling operations. In said Figs. 9 and 10 substantially all parts of the knife and staple device and conveyor devices are similar to those shown in Figs. 1 to 7 except that the knife is secured to the cross bar 38 instead of to the connecting rods 40, bearing slots 37 for knife carrying bar 44 are made longer by changing the shape of frame members 35, the rollers 52 on the end portions of the die block 49 are omitted, and the die block 49 is fixedly secured to the frame bars 36, by means such as bolts 87. All parts in Figs. 9 and 10 which are similar to those in Figs. 1 to 7 are correspondingly numbered and are not herein further described in detail.

The driving and control means shown in Figs. 9 and 10 differ from those previously described and are as follows: The lever 64 of the single revolution clutch 62 is conected by the link 65 with the plunger 88' of a solenoid 88 which is connected by conductors 89 with a source of energy 90. A normally open switch 91, controlled by a retarded relay 92, is interposed in the conductors 89 to open and close the circuit to the solenoid 88. A light responsive cell 93, of a form well known and commonly termed an electric eye, is positioned so that it will be subjected to reflected light from a source of light 93' directed against one side of the traveling plywood. The cross banding, being coated with glue, will reflect a different amount of light than the face members. This contrast may be accentuated by using a coloring matter in the glue. This difference in the light reflecting qualities of the face members and cross banding is sufficient to operate the light responsive cell 93 and said cell 93 will close a circuit through conductors 95 and source of energy 94 to the relay 92 when the cell 93 is subjected to the reflection of light from the cross banding and will open said circuit at all other times. The operation of relay 92 closes the circuit to the solenoid 88 each time a space between the plywood face members passes the cell 93. The operation of solenoid 88 starts the operation of a single revolution clutch 62 and at the same time disconnects a clutch 96 through which power to drive the conveyors is transmitted to the shaft 19. The retarded relay does not necessarily close the switch 91 the instant the cell 93 operates, but said relay will be timed to close the switch 91 and stop the conveyors and start the operation of the cut off and stapling means at the time the plywood is properly positioned for cutting and fastening. Also this retarded relay will hold the switch 91 closed until after the cut off and stapling devices have operated, after which it will allow the switch 91 to open and the spring 75 will return the several parts to the position shown in Fig. 10, thus engaging the clutch 96 and starting the conveyors. The clutch 96 is connected with the plunger 88' of solenoid 88 by a link 98 and bell crank shifter lever 99 which is fulcrumed on pivot 100.

The apparatus shown in Figs. 9 and 10 operates in substantially the same manner as the previously described devices except that the die block, stapling devices and knife do not move transversely and the plywood is stopped and held stationary during each cutting and fastening operation.

Furthermore, in said Figs. 9 and 10, I have illustrated a control means actuated by the cross banding stock between two adjacent panels as distinguished from the manually controlled means of Figs. 1 to 7. Also in Fig. 13, a further type of control means is illustrated. Obviously any of the types of control means herein disclosed may be employed with the stapling and cut off devices of Figs. 1 to 7 or any such devices of the alternative constructions.

In Figs. 11 and 12 I have shown a modified form of cut off means for cutting off material such as plywood stock while the material is in motion. This means comprises a die roll 101 positioned between two conveyors 20 and 76 with the peripheral portion of the die roll substantially tangent to the plane of the conveyors. A rotary knife 102 is mounted in suitable rotary knife holder means 103 above the plane of the conveyors and directly above the die roll 101. Preferably the die roll is driven at a peripheral speed equal to the speed of travel of the conveyors 20 and 77 by driving means such as a friction belt 104 positioned in contact with the die roll and supported on sheaves 105, 106, 107 and 108. Sheave 106 is driven by gear wheels 109 from shaft 110. Shaft 110 is driven from shaft 19 by belt means 111 operating on sheaves 112 and 113. The several sheaves and gear wheels have the proper gear ratio to drive the belt 104 at the same speed as the conveyors 20 and 76 and this imparts to roll 101 a peripheral speed equal to the lineal speed of the conveyors. Preferably sheave 107 is adjustable so as to serve as a tightener for belt 104. The rotary knife holder 103 is driven through a single revolution clutch 62 which will rotate said knife holder at predetermined intervals through cutting cycles of one complete revolution each. Normally the knife 102 will be positioned clear of the roll 101 as shown by full lines in Fig. 11. When rotated it will be moved in the same direction as the material to be cut and in the course of its movement will make cutting engagement with the moving roll 101, as shown by dotted lines in Fig. 11 and will sever while in motion any traveling material such as plywood stock that is positioned between the knife and the roll.

Fig. 13 shows an alternative control means for automatically controlling the operation of the stapler and cut off means by mechanical devices positioned to contact the moving plywood, said mechanical devices being actuated by the surface contour of the laid up plywood at the locations where the face members of the panels are spaced apart and the cross banding stock extends across these spaces. In said Fig. 13, 114 is a frame member that is pivoted for swinging movement on a fixed pivot 115 which is positioned adjacent one end portion of the frame 114. The other end portion of the frame member 114 is yieldingly supported on a spring 116. The spring 116 is positioned on a bolt 117 which extends through a fixed frame lug 118 and is provided with nuts 117'. The spring 116 yieldingly urges the movable end portion of the frame member 114 upwardly but permits said movable end portion of said frame member to be moved downwardly by pressure exerted against the frame member. The bolt 117 limits the upward movement of the movable end portion of the frame member 114.

The frame member 114 is positioned a short distance below the plane of travel of the plywood and substantially parallel to this plane and preferably a short distance in advance of the die block 49. A fragment of this die block is shown in Fig. 13.

A hook member 119 is mounted in the frame member 114 for longitudinal movement relative to said frame member. This hook member 119 has a catch portion 120 positioned to engage with a shoulder 121 formed by the end portion of a lower face member 27 of the plywood. Also this hook member 119 is guided for longitudinal movement by means such as a slot 122 in the hook member through which extends a transverse pin 123 which is rigid with the frame member 114. A tension spring 124 connects the hook member 119 with the frame member 114 and urges the hook member toward the pivoted end of the frame member 114.

Roller means 125 is rotatably mounted on the movable end portion of the frame member 114 beyond the catch portion 120 of the hook 119 and at the side of the hook 119. Only one roller is shown but obviously more than one roller may be provided.

Electric switch means is connected with the hook member 119 in such a manner as to be actuated by longitudinal movement of the hook member 119 relative to the housing 114. This electric switch means may consist of a spring switch terminal 126 mounted on the housing 114 and adapted to be electrically contacted by another spring switch terminal 127 which is carried by the hook member 119. The terminals 126 and 127 are connected with electrical conductors, such as the electrical conductors 95 of Fig. 10, so that the operation of stapling and cut off means is controlled by the opening and closing of the circuit controlled by these terminals.

In the operation of the devices shown in Fig. 13, the laid up plywood will travel in the direction indicated by the arrows. The roller 125 will roll on the lower surface of the plywood and the tip of the catch portion 120 of the hook 119 will be approximately flush with the portion of the roller that engages the plywood but to the left, as respects the showing in Fig. 13, the point of engagement of the roller with the plywood. When a space between the edges of adjacent face members 27 moves into registration with the catch portion 120 of the hook and the roller 125, the catch portion 120 of the hook and the roller 125 will drop into this space and will engage with the cross banding stock 26 that extends across such space as shown in Fig. 13. As the plywood continues to move to the right from the position shown in Fig. 13, the edge portion 121 of a lower face member 27 will engage with the catch portion 120 of the hook member 119 and move such hook member 119 toward the roller 125. Movement of hook member 119 toward roller 125 will close the switch formed by terminals 126 and 127. Also movement of the plywood to the right from the position shown in Fig. 13 will cause the shoulder 121 formed by the edge portion of a lower face member 27 to engage with the roller 125 and depress the movable end portion of the frame member 114 enough to disengage the catch member 120 from the shoulder 121. This disengagement of the catch member will occur after the switch 126—127 has been closed and upon such disengagement of said catch member the spring 124 will return the hook 119 to the position shown in Fig. 13 and open the switch 126—127. The spring 124 provides a resiliency which avoids shock when the shoulder 121 encounters the catch portion 120 and this insures that the laid up panels will not be displaced relative to each other.

As the switch terminals 126—127 are connected with the conductors 95 which supply energy to the retarded relay 94 of Fig. 10, it will be apparent that each closing of the switch formed by terminals 126—127 will impart a cycle of operation to the stapler and cut off means. Also it will be apparent that the retarded relay may be timed so as to cause successive cycles of operation to be carried out at the proper time for stapling and cutting off the laid up plywood stock.

Summarizing the mode of operation of my invention, the lower face members 27 are placed in line and spaced apart edge to edge relation on the conveyor belt 20. Next, cross banding stock 26 is provided with adhesive material for both faces. I have illustrated glue rolls for applying liquid glue to both faces of the cross banding stock. However, it is to be understood that any other well known manner of placing glue on both faces of the cross banding stock may be employed. For example, if dry powdered glue is to be used, the same may be spread on the upper surface of the lower face members 27 and then on the upper surface of the cross banding stock 26. Also, film glue may be used and a film of glue placed on the upper surface of each lower face member 27 and other films of glue placed on the upper surface of the cross banding stock 26. The cross banding stock may be fed as a continuous strip directly onto the lower face members 27 or the same may be fed as random width pieces of cross banding stock and positioned in edge to edge adjoining relation on the lower face members 27. In the event that wet glue is to be used, I prefer to feed the cross banding stock in a direction transverse of the grain thereof and by means of the flexible conveyors 32 shown in Fig. 1. In this way the glue coated cross banding stock, whether in random width pieces or as a continuous sheet, may be transported without wiping of the glue from the surfaces of the cross banding material. The cross banding stock is placed on the lower face members and with the cross banding stock extending continuously over both the lower face members and the spaces between the lower face members. Then upper face members are placed on the cross banding stock with each upper face member in substantial registration with a lower face member.

Next, the face members and the cross banding stock therebetween are preferably secured together. As illustrative of mechanical means of securing the face members and the cross banding stock therebetween together, I have illustrated the use of standard wire stapling means. Obviously, other mechanical means may be employed in place of these standard stapling devices, such as sewing.

Preferably simultaneously with the mechanical securing together step, I employ means to sever the cross banding extending between two face members which are spaced apart in edge to edge relation. The means for severing the cross banding stock is preferably operable while the stock is in motion. I have illustrated a rotary cutting knife in Figs. 11 and 12, as well as the reciprocable cutting knife in Figs. 1 to 8, which will accomplish such purpose. However, where efficiency may be somewhat sacrificed, the cutting device illustrated in Figs. 9 and 10 may be employed. In such structure the panels are stopped during the stapling and severing operation. Also I have illustrated manual and automatic means for controlling the operation of the stapling and severing means.

After the three ply panels have been formed in the manner just set forth, they may be delivered directly to a transfer means for either cold processing or hot processing. Should multiple ply panels, other than three ply panels, be desired, the panels may be returned one or more times to the head of the assembly line to form panels, as five ply, seven ply, etc. Preferably the return mechanism for returning the panels to the head of the assembly line is in the form herein disclosed. This for the reason that such permits most efficient use of men, material and devices. Also where the conveyor system is synchronized with hot press devices, I may produce one five ply panel during the same interval of time as required to produce two three ply panels, thus keeping the production of the conveyor line positively synchronized with the needs of the hot plate press or presses.

Obviously, changes may be made in the forms, dimensions and arrangement of the parts of my invention, without departing from the principle thereof, the above setting forth only preferred forms of embodiment.

I claim:

1. Apparatus of the class described comprising a travelling conveyor for continuously moving sheet material; a die member positioned to engage one side of the moving material and mounted for reciprocating movement in a plane parallel to the conveyor and movable in one direction of travel substantially synchronously with the travelling conveyor and the sheet material thereon; a crank arm mounted in vertical spaced relation to said conveyor; a slide member mounted in vertical spaced relation to said conveyor and with the conveyor travelling in a plane vertically intermediate said crank arm and said slide member; a connecting rod movable in a plane alongside of and out of the path of travel of said conveyor and connected at its ends to said slide and said crank arm and slidably connected intermediate its length with said die member; and a knife member movable with said connecting rod, whereby the up and down and forward and back movements of said connecting rod are imparted to the knife member to move the same toward and away from and forward and back with said die member.

2. Apparatus of the class described comprising a travelling conveyor for continuously moving sheet material; a die member positioned to engage one side of the moving material and mounted for reciprocating movement in a plane parallel to the conveyor and movable in one direction of travel substantially synchronously with the travelling conveyor and the sheet material thereon; a crank arm mounted in vertical spaced relation to said conveyor; a slide member mounted in vertical spaced relation to said conveyor and with the conveyor travelling in a plane vertically intermediate said crank arm and said slide member; a connecting rod movable in a plane alongside of and out of the path of travel of said conveyor and connected at its ends to said slide and said crank arm and slidably connected intermediate its length with said die member by roller means; and a knife member carried by and movable with said connecting rod, whereby the up and down and forward and back movements of said connecting rod are imparted to the knife member to move the same toward and away from and forward and back with said die member.

3. Apparatus of the class described comprising a travelling conveyor for continuously moving sheet material; a die member positioned to engage one side of the moving material and mounted for reciprocating movement in a plane parallel to the conveyor and movable in one direction of travel substantially synchronously with the travelling conveyor and the sheet material thereon; stapling devices movable with said die member and mounted to provide clearance between the stapling devices and the die member for travelling material; a crank arm mounted in vertical spaced relation to said conveyor; a slide member mounted in vertical spaced relation to said conveyor and with the conveyor travelling in a plane vertically intermediate said crank arm and said slide member; a connecting rod movable in a plane alongside of and out of the path of travel of said conveyor and connected at its ends to said slide and said crank arm and slidably connected intermediate its length with said die member; a knife member movable with said connecting rod, whereby the up and down and forward and back movements of said connecting rod are imparted to the knife member to move the same toward and away from and forward and back with said die member; and stapling devices operating means connected with said connecting rod, whereby said die member functions as a support for both said knife member and said stapling devices and moves synchronously therewith.

THOMAS R. ROBINSON.